(12) United States Patent
Vorage et al.

(10) Patent No.: US 8,771,524 B2
(45) Date of Patent: Jul. 8, 2014

(54) VORTEX MIXER AND METHOD OF OBTAINING A SUPERSATURATED SOLUTION OR SLURRY

(75) Inventors: Marcus J. A. W. Vorage, Balloo (NL); Neda Radenovic-Pelletier, Utrecht (NL); Jildert E. Visser, Assen (NL); Paola S. Garzon Lopez, Dordrecht (NL)

(73) Assignee: Purac Biochem B.V., Gorichem (NL)

( * ) Notice: Subject to any disclaimer, the term of this patent is extended or adjusted under 35 U.S.C. 154(b) by 560 days.

(21) Appl. No.: 12/320,882

(22) Filed: Feb. 6, 2009

(65) Prior Publication Data

US 2009/0201760 A1 Aug. 13, 2009

Related U.S. Application Data

(60) Provisional application No. 61/006,980, filed on Feb. 8, 2008.

(51) Int. Cl.
*B01F 3/08* (2006.01)
*B01F 5/00* (2006.01)
*B01J 19/24* (2006.01)

(52) U.S. Cl.
CPC ............... *B01F 3/08* (2013.01); *B01F 3/0803* (2013.01); *B01F 5/0057* (2013.01); *B01F 5/0062* (2013.01); *B01J 19/24* (2013.01)
USPC ................ 210/788; 210/512.1; 366/165.1; 366/177.1

(58) Field of Classification Search
CPC .......... B01F 3/08; B01F 3/083; B01F 5/0057; B01F 5/0062; B01J 19/24
USPC .............. 366/165.1, 165.5, 177.1; 210/512.1, 210/788; 209/719, 727, 715, 720, 733; 55/459.1
See application file for complete search history.

(56) References Cited

U.S. PATENT DOCUMENTS

| | | | |
|---|---|---|---|
| 2,890,929 A | | 6/1959 | Rummert |
| 3,501,014 A | * | 3/1970 | Fitch, Jr. et al. ........... 210/512.1 |
| 4,652,363 A | * | 3/1987 | Miller ......................... 210/512.1 |
| 4,734,109 A | | 3/1988 | Cox |
| 4,876,016 A | * | 10/1989 | Young et al. ................ 210/512.1 |
| 5,017,288 A | * | 5/1991 | Thew et al. ................. 210/512.1 |
| 5,071,542 A | * | 12/1991 | Tuszko et al. ................. 209/719 |
| 5,667,686 A | * | 9/1997 | Schubert ..................... 210/512.1 |

(Continued)

FOREIGN PATENT DOCUMENTS

| EP | 0 307 821 A1 | 3/1989 |
|---|---|---|
| EP | 0 646 407 A1 | 4/1995 |

(Continued)

OTHER PUBLICATIONS

Translation of Japanease International Publication No. WO 2007/049377 A1.*

(Continued)

*Primary Examiner* — David A Reifsnyder
(74) *Attorney, Agent, or Firm* — Peter J. Ims; Westman, Champlin & Koehler, P.A.

(57) ABSTRACT

The invention relates to a vortex mixer comprising a mixing chamber having an axial outlet and at least one inlet which is at least substantially tangential. The mixer further comprises a residence chamber extending axially on the side of the mixing chamber opposite from the axial outlet.

20 Claims, 1 Drawing Sheet

(56) References Cited

U.S. PATENT DOCUMENTS

| | | |
|---|---|---|
| 6,207,064 B1 | 3/2001 | Gargas |
| 6,467,947 B1 | 10/2002 | Welsh |
| 6,596,170 B2 * | 7/2003 | Tuszko et al. .............. 210/512.1 |
| 7,323,038 B2 * | 1/2008 | Reiling ........................ 55/459.1 |
| 2004/0099615 A1 * | 5/2004 | Arnaud ......................... 210/788 |
| 2004/0252584 A1 * | 12/2004 | Ji et al. ......................... 366/341 |
| 2005/0155541 A1 | 7/2005 | McCausland et al. |

FOREIGN PATENT DOCUMENTS

| | | |
|---|---|---|
| EP | 1593417 | 11/2005 |
| GB | 2 130 908 A | 6/1984 |
| JP | 5031471 | 3/1975 |
| JP | 5251757 | 4/1977 |
| JP | A-60-161721 | 8/1985 |
| JP | 04-141204 | 5/1992 |
| WO | WO 02/04125 A2 | 1/2002 |
| WO | WO 2004/052496 AI | 6/2004 |
| WO | 2007049377 | 5/2007 |

OTHER PUBLICATIONS

Jul. 26, 2011 Office Action issued in EP Application No. 09707430.6.
Japanese Notice of Reasons for Rejection, mailed Nov. 29, 2012 in connection with Japanese Patent Application No. 2010-545470.
Abstract of Japanese Patent Document JP 52-51757, Apr. 25, 1977.
Abstract of International Patent Document WO 2007/049377, May 3, 2007.
Abstract of Japanese Patent Application Laid-Open No. Hei-04-141204, May 14, 1992.
First Office Action issued by the Chinese Patent Office on Dec. 27, 2012 in connection with Chinese Patent Application No. 200980104272.3.

* cited by examiner

VORTEX MIXER AND METHOD OF OBTAINING A SUPERSATURATED SOLUTION OR SLURRY

The invention relates to a vortex mixer comprising a mixing chamber having an axial outlet and at least one inlet which is at least substantially tangential, i.e. which extends in a direction of which the tangential component is larger than the radial and axial components. The invention also relates to a method of obtaining a supersaturated solution or slurry of a reaction product wherein at least first and second reactants are introduced into said vortex mixer.

EP 646 407 discloses a vortex mixer which includes a cylindrical mixing chamber having an axial outlet and a plurality of inlets so arranged that a vortex is set up in the mixing chamber when fluid is admitted to the mixing chamber via the inlets. The arrangement may be such that two or more liquid reagents can be admitted to the chamber, or a single reagent or additive can be added to a main liquid flowing through the mixer.

The liquid leaving the vortex mixer does so in the form of a vortex. As a result, there is a degree of reverse flow along the inside of the vortex. This reverse flow can extend for a distance equal to several tens of the diameter of the exit pipe from the mixing chamber. EP 646 407 relates to "the operation of" and means (denoted in the drawings by numeral 5) for minimising reverse flow in mixed fluids issuing from the vortex mixer.

WO 02/04125 discloses a system and method for commination, blending and processing of particles of a material and an additive using a high pressure fluid energy mill. The mill outputs a slurry comprised of particles of the material, the additive and the energy transfer fluid. The slurry is introduced into a hydrocyclone for separating particles by size. The slurry is introduced into a spray dryer. The spray dryer atomizes the slurry, which falls through a heat zone, vaporizing the fluid. A collector catches the dry falling particles.

US 2005/0155541 discloses how small crystals are made by mixing a solution of a desired substance with an antisolvent in a fluidic vortex mixer in which the residence time is less than 1 s, for example 10 ms. The liquid within the fluidic vortex mixer (12) is subjected to high intensity ultrasound from a transducer (20, 22). The solution very rapidly becomes supersaturated, and the ultrasound can induce a very large number of nuclei for crystal growth. Small crystals, for example less than 5 μm, are formed. The resulting suspension is treated so as to add or remove ingredients, and then spray dried using an atomiser tuned to create small droplets in such a way that each droplet should contain not more than one crystal.

U.S. Pat. No. 4,734,109 discloses an effluent treatment apparatus adapted for conditioning an effluent stream within a treatment zone. The apparatus is comprised of an injection system which includes at least one injection nozzle having a flexible discharge tube with an effective-length at least equal to the characteristic wavelength for flexural resonant vibration thereof when pressurized fluid issues therefrom. The apparatus shown in FIGS. 1 and 2 is "based generally upon a conventional cyclone configuration". The air treatment apparatus according to U.S. Pat. No. 4,734,109 "extends the range of efficient separation, permitting the classification of micron or sub-micron size particles from effluent conducted through the zone 16". I.e., this apparatus is a separator, not a mixer.

It is an object of the present invention to provide an improved vortex mixer.

To this end, the vortex mixer according to the present invention is characterized by a residence chamber extending axially on the side of the mixing chamber opposite from the axial outlet. It is preferred that the residence chamber is dimensioned to generate, during operation, an outer vortex in a direction away from the outlet and an inner vortex in a direction towards the outlet.

It is further preferred that the residence chamber is a closed chamber, i.e. that all liquids introduced in the mixer leave the mixer on the same side, typically via a single outlet.

It was found that the double vortex sustains intensive mixing of the components and thus enables prolonged mixing. In case of e.g. reactants yielding a supersaturated solution and/or slurry, prolonged intensive mixing in turn enables reactants to react more completely and/or results in an increased number of seed crystals.

It is preferred that the internal length (L) of the residence chamber is in a range from 10 cm to 2 m, preferably in a range from 15 cm to 1 m, more preferably in a range of 20 cm to 70 cm, the inner diameter (D) of the residence chamber is in a range from 1 cm to 20 cm, preferably in a range from 2 cm to 10 cm, and/or the aspect ratio (L/D) is in a range from 0.5 to 50, preferably in a range of 3 to 15.

If, in addition to adjustable flow rates of the components fed to the mixer, the length of the residence chamber is adjustable and/or the mixer is part of a kit comprising at least two interchangeable residence chambers of different lengths, shear in and residence time of the mixture can be selected independently.

The invention also relates to a method of obtaining a supersaturated solution of a reaction product, wherein at least a first liquid stream containing a first reactant and a second liquid stream containing a second reactant are introduced into the above vortex mixer, generating an outer vortex in a direction away from the outlet of the mixer and an inner vortex in a direction towards the outlet, and wherein the reactants react to form the supersaturated solution.

It is preferred that the first stream is a solution of an organic acid, e.g. selected from lactic acid, gluconic acid, and citric acid, and/or the second stream is a suspension of a base, e.g. selected from magnesium (hydr)oxide (which stands for magnesium oxide or magnesium hydroxide), calcium (hydr)oxide, zinc (hydr)oxide, and aluminium (hydr)oxide. Examples of products are lactate salts, gluconate salts, and citrate salts of, e.g., magnesium, calcium, zinc and aluminium. Salts, e.g. Mg, Ca, Zn, and Al salts, of other organic or inorganic acids can also be obtained.

The method according to the present invention facilitates the depletion of the reactants and the production of relatively small crystals, e.g. having a mean size in a range from 1 to 100 μm, preferably in a range from 1 to 20 μm, and/or of crystals containing less or no inclusions of one of the reactants.

It is preferred that the pressure in the mixer is at least 0.3 bar (above atmospheric pressure), preferably at least 0.5 bar. Thus, the time required for the crystals to reach a desired particle size distribution, typically by collecting the supersaturated solution in a stirred vessel or crystallizer, is reduced significantly. Of course, the pressure is limited by the mechanical strength of the mixer used, e.g. to 5 or 10 bar.

It was found that at the outlet of the vortex mixer highly supersaturated solutions with very high dry solids content, e.g. more than 25 wt % or more than 30 wt % and e.g. up to 80 wt % or up to 50 wt %, can be produced when still at low viscosity. A benefit of the vortex mixer in this case is that mixing takes place before a slurry containing large amounts of small crystals is formed. These slurries containing large amounts of small crystals are well known for their high viscosities at high dry solids concentrations. Mixing of liquids at low viscosity is much faster and less energy consuming than mixing of high viscosity liquids or slurries. Thus, by using the vortex mixer, it is possible to produce slurries with very high dry solids concentrations which will be difficult if not impossible to obtain in a stirred tank reactor configuration.

Products obtained with the present invention were found to be very suitable for various applications such as cosmetic and personal care applications, dental or oral care applications and technical applications.

Also, the products obtained with the present invention, in particular magnesium lactate, zinc lactate, and calcium citrate, can be used in various food products, including vitamin and mineral supplements and beverages, and are suitable to make tablets of. This creates further new applications in which before no metal lactate or citrate powder could be used.

The invention will now be explained in more detail with reference to the figures, which show several embodiments of a vortex mixer according to the present invention.

Figure 1:
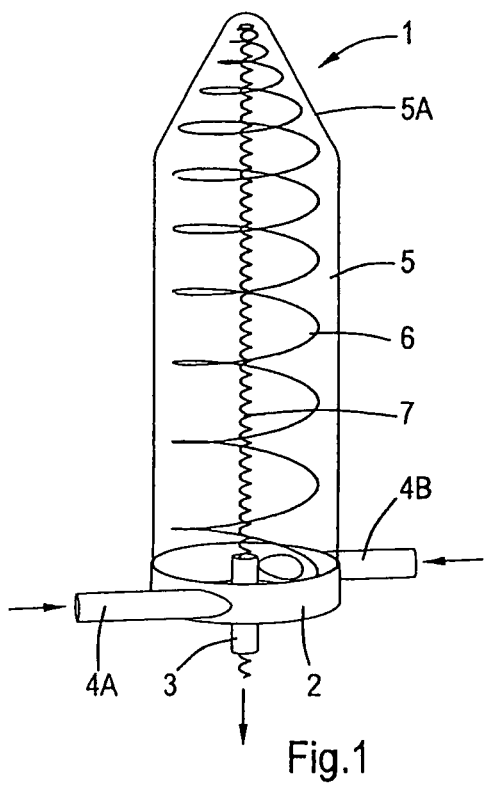
FIGS. 1 and 2 are perspective views of a first and second embodiment of a vortex mixer according to the present invention comprising a cylindrical residence chamber.

The drawings are not necessarily to scale and details, which are not necessary for understanding the present invention, may have been omitted. Further, elements that are at least substantially identical or that perform an at least substantially identical function are denoted by the same numeral. Furthermore, terms as "downwards", "up", "horizontal", and the like relate to the orientation of elements as shown in the drawings.

FIG. 1 shows a first embodiment of a vortex mixer 1 according to the present invention comprising a mixing chamber 2 having an axial outlet 3 directed downwards and two horizontal inlets 4A, 4B extending tangentially with respect to the circumference of the mixing chamber 2. In this example, the mixing chamber 2 has an internal height of 20 mm and a diameter of 35 mm. The inlets 4A, 4B are located at 180° from each other.

A closed residence chamber 5 is detachably connected to the mixing chamber 2, e.g. by means of flanges, a clamp or a threaded coupling (not shown), and extends axially on the side of the mixing chamber 2 opposite from the axial outlet 3 and beyond the inlets 4 and the mixing chamber 2. In general, it is preferred that the outlet 3 comprises a pipe that extends axially through the mixing chamber 2 and ends at or near the transition between the mixing chamber 2 and the residence chamber 5 or inside the residence chamber 5, thus avoiding a short-cut of reactants from the inlets 4A, 4B to the outlet 3.

The residence chamber 5 comprises a cylindrical main portion and a conical top portion 5A. In this example, the residence chamber 5 has an inner diameter (D) of 35 mm and an internal length of 25 cm.

The parts (2, 5) described above are made of a material that provides sufficient strength to withstand internal pressures in excess of 1 bar, e.g. 5 or 10 bar, and that provides smooth internal surfaces so as to reduce or avoid disturbance of internal flow and the formation of encrustations. Suitable materials include, e.g., stainless steel, engineering polymers such as polyetheresterketone (PEEK), glass, and glass lined steel. For the same reasons, it is preferred that, at the interface between the mixing chamber and the residence chamber, the cross-sections of the chambers are at least substantially identical and in register.

During operation, a first liquid stream of a solvent containing a first reactant, e.g. lactic acid solved in water, and a second liquid stream containing a second reactant, e.g. a suspension of magnesium (hydr)oxide in water, were fed to the vortex mixer, e.g. by means of a high pressure pump at 1.5 bar, at a temperature of 60° C., and at flow rates of 0.5 and 1 $m^3$/h, respectively. A double vortex was generated, viz. an outer vortex 6 rising up the residence chamber 5 and an inner vortex 7 forced down the chamber 5 and towards the outlet 3.

A double vortex sustains intensive mixing during prolonged residence times, in this example 0.5 seconds, which, on the one hand, was sufficiently long to substantially deplete all reactants and form seed crystals and, on the other hand, was sufficiently short to prevent crystal growth within the mixer. In this example, the supersaturated solution was collected in a stirred vessel eventually yielding a slurry containing crystals having a mean size of 15 μm and a narrow size distribution and containing essentially no reactant.

The presence of reactant in the slurry or attached to the crystals may be an indication that the residence time was too short. In that case, the residence chamber can be replaced by a longer but otherwise identical residence chamber. Conversely, the presence of larger crystals or a broader size distribution may be an indication that crystal growth already commenced in the mixer. In that case, the residence chamber can be replaced by a shorter but otherwise identical residence chamber. In the method according to the invention, residence times are typically in a range from 0.1 to 2 s, more specifically in a range from 0.2 to 1 s.

In a further example, again using a vortex mixer with a diameter of 35 mm, a first liquid stream of citric acid dissolved in water at 70 wt % and a second liquid stream of a suspension of calciumhydroxide in water ('milk of lime') at 28 wt %, were fed to the vortex mixer by means of dosing pumps at 1 bar (mea a temperature of 60° C., and flow rates of 0.310 and 0.900 $m^3$/hr respectively. Mixing during a residence time of 0.5 seconds inside the vortex was sufficient to substantially deplete all reactants and form seed crystals. At the outlet of the vortex mixer, a temperature of approximately 89° C. was measured indicating that (exothermic) neutralization was complete.

The supersaturated solution leaving the vortex mixer was collected in a stirred vessel and allowed to form a slurry in a slightly acidic environment (pH=4.3). During the next 4 hours, the viscosity increased to 10 Pa·s and a slurry was formed containing calciumcitrate.4.aq crystals with a mean particle size of 7.7 μm. This slurry was suitable for spray-drying.

In a comparative example, performed under similar conditions but at a pressure of 0.2 bar, a similar mean particle size was obtained after no less than 20 hours.

By using a longer residence chamber and/or a higher pressure, a slurry having a mean particle size suitable for spray-drying can be obtained already during mixing, i.e. inside the vortex mixer. In such configurations and/or under such conditions, respectively, the vortex mixer could be connected directly to a spray dryer or at least in a continuous process.

The inlets of the vortex mixer may have different cross-sections, e.g. the aspect ratio of an inlet for a liquid having a relatively high viscosity can be selected higher so as to introduce the liquid into mixer in the form of a relatively thin layer or film.

Figure 2:
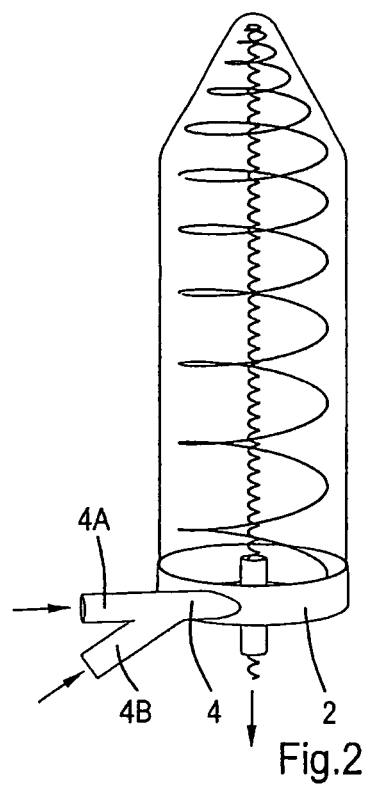

Instead of two separate inlets, the inlets 4A, 4B can be joined to form a common inlet 4 of the mixing chamber 2, as shown in FIG. 2. Further alternatives include, but are not limited to, mixing chambers comprising three or more inlets, e.g. three inlets spaced at 120° along the mixing chamber, and/or inlets extending in a direction having a radial component.

Figure 3:
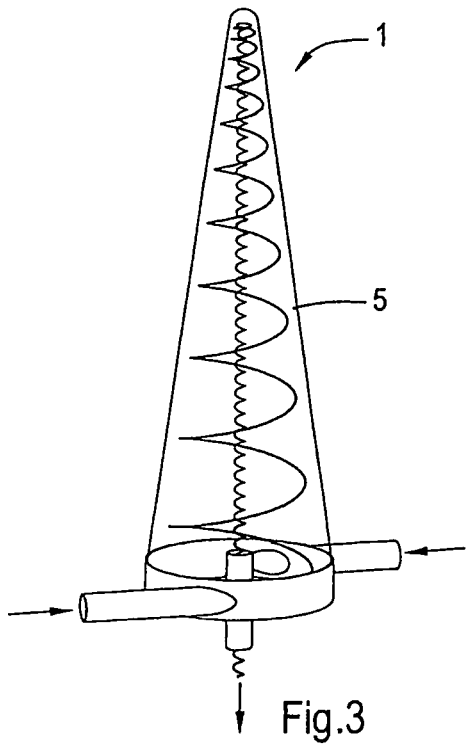
FIGS. 3 and 4 are perspective views of a third and fourth embodiment of a vortex mixer according to the present invention comprising a conical residence chamber.
Figure 4:
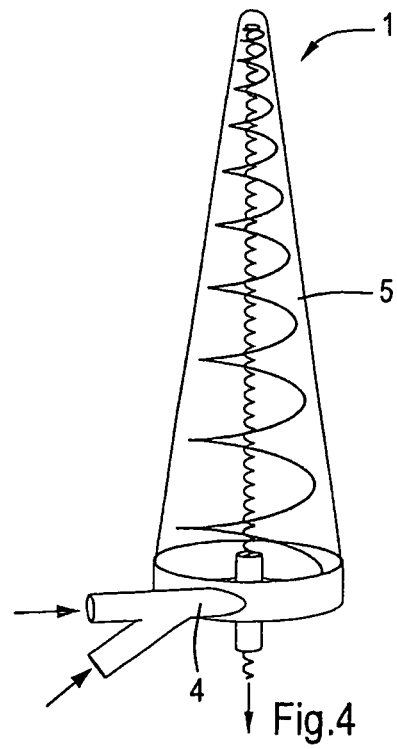

The conical top portion 5A reinforces formation of a second vortex. FIG. 3 shows a vortex mixer 1 similar to the one shown in FIG. 1, but having a residence chamber 5 which is conical over its entire length. Increasing the (relative) length of the conical portion results in a more gradual acceleration of liquid in the outer vortex. FIG. 4 shows a vortex mixer 1 having a common inlet 4 and a residence chamber 5 which is conical over its entire length.

The invention is not restricted to the above-described embodiments which can be varied in a number of ways within the scope of the claims. For instance, the vortex mixer can be employed to thoroughly mix non-reactants, e.g., cold and hot water to obtain lukewarm warm water of a selected temperature or oil(s) and water to prepare emulsions for, e.g., pharmaceutical of cosmetic purposes.

The invention claimed is:

1. Vortex mixer for mixing materials comprising a mixing chamber having an axial outlet and at least one inlet that is at least substantially tangential, and a closed residence chamber in fluid communication with the mixing chamber and extending axially on the side of the mixing chamber opposite from the axial outlet, wherein substantially all of the materials introduced into the vortex mixer leave the vortex mixer on the same side through the axial outlet.

2. Vortex mixer according to claim 1, wherein the residence chamber is dimensioned to generate, during operation, an outer vortex in a direction away from the outlet and an inner vortex in a direction towards the outlet.

3. Vortex mixer according to claim 1, wherein at least a portion of the residence chamberis conical.

4. Vortex mixer according to claim 1, wherein an internal length (L) of the residence chamber is in a range from 10 cm to 2 m, an inner diameter (D) of the residence chamber is in a range from 1 cm to 20 cm, and/or an aspect ratio (L/D) is in a range from 0.5 to 50.

5. Vortex mixer according to claim 1, wherein at an interface between the mixing chamber and the residence chamber the cross-sections of the chambers are at least substantially identical and in register.

6. Vortex mixer according to claim 1, wherein the length of the residence chamber is adjustable and/or wherein the mixer is part of a kit comprising at least two interchangeable residence chambers of different lengths.

7. Vortex mixer according to claim 1, wherein the outlet comprises a pipe that extends through the mixing chamber and ends at or near a transition between the mixing chamber and the residence chamber or inside the residence chamber.

8. Vortex mixer according to claim 1, wherein the mixing chamber comprises a plurality of substantially tangential inlets.

9. Vortex mixer according to claim 1, wherein the at least one substantially tangential inlet is a common inlet formed from a plurality of inlets.

10. Method of obtaining a supersaturated solution or slurry of a reaction product comprising:
   introducing at least a first liquid stream containing a first reactant and a second liquid stream containing a second reactant into a vortex mixer according to claim 1,
   generating an outer vortex in a direction away from the outlet of the mixer and an inner vortex in a direction towards the outlet, and
   reacting the reactants to form the supersaturated solution.

11. Method according to claim 10, wherein the first stream is a solution of one or more of an organic acid, lactic acid, gluconic acid, or citric acid, and/or the second stream is a suspension of one or more of a base, magnesium oxide, magnesium hydroxide, calcium oxide, calcium hydroxide, zinc oxide, zinc hydroxide, aluminum oxide or aluminum hydroxide.

12. Method according to claim 10, wherein the pressure in the mixer is at least 0-3 bar.

13. Method according to claim 10, wherein the supersaturated solution has a dry solids content of more than 25 wt %.

14. A vortex mixer for mixing at least two liquid streams of different materials, the mixer having a first end and a second end and a central axis extending from the first end to the second end, the mixer comprising:
   a mixing chamber comprising:
      a bottom surface and an inner wall surface extending from the bottom surface and a top edge;
      an axial outlet in the bottoms surface proximate the first end; and
      at least one inlet located within the inner wall surface proximate the first end wherein the at least one inlet is in at least substantially tangential to the inner surface of the mixing chamber; and
   a closed residence chamber defined by an inner surface, the closed residence chamber coupled to the mixing chamber at the top edge, the residence chamber in fluid communication with the mixing chamber and extending axially on the side of the mixing chamber opposite from the axial outlet, and configured such that the at least two liquid streams enter the mixing chamber through the at least one inlet where in the at least two liquid streams of different materials are mixed in an outer vortex that is substantially adjacent the inner wall surface of the mixing chamber and the inner surface of the residence chamber and in a direction of flow from the first end to the second end and an inner vortex that is located between the central axis and the outer vortex and in a direction of flow from the second end to the first end, wherein substantially all of the materials introduced into the vortex mixer leave the vortex mixer through the axial outlet at a desired composition.

15. The vortex mixer according to claim 14, wherein at least a portion of the inner surface of the residence chamber is conical.

16. The vortex mixer according to claim 14, wherein the outlet comprises a pipe that extends through the mixing chamber and having a first end located at or near a transition between the mixing chamber and the residence chamber or inside the residence chamber.

17. The vortex mixer according to claim 16, wherein the first end of the pipe is located even with or above a top edge of the at least one inlet.

18. The vortex mixer according to claim 14, wherein the mixing chamber comprises a plurality of inlets within the inner wall surface proximate the first end wherein the plurality of inlets are in at least substantially tangential to the inner surface of the mixing chamber.

19. The vortex mixer according to claim 14, wherein the at least one substantially tangential inlet is a common inlet formed from a plurality of inlets.

20. The vortex mixer according to claim 14, and further comprising:
   a source of an organic acid wherein the first stream includes the organic acid; and
   a source of a suspension of a base wherein the second stream includes the suspension of a base.

* * * * *